United States Patent
Hershey et al.

(10) Patent No.: US 7,269,560 B2
(45) Date of Patent: Sep. 11, 2007

(54) SPEECH DETECTION AND ENHANCEMENT USING AUDIO/VIDEO FUSION

(75) Inventors: John R. Hershey, San Diego, CA (US); Trausti Thor Kristjansson, Redmond, WA (US); Hagai Attias, Seattle, WA (US); Nebojsa Jojic, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 836 days.

(21) Appl. No.: 10/608,988

(22) Filed: Jun. 27, 2003

(65) Prior Publication Data

US 2004/0267536 A1    Dec. 30, 2004

(51) Int. Cl.
*G10L 21/00*    (2006.01)
(52) U.S. Cl. ..................... 704/270; 704/240
(58) Field of Classification Search ............... None
See application file for complete search history.

(56) References Cited

U.S. PATENT DOCUMENTS

2003/0110038 A1*  6/2003  Sharma et al. ............. 704/270
2004/0088272 A1*  5/2004  Jojic et al. .................. 706/13

OTHER PUBLICATIONS

J.W. Fisher III, T. Darrell, W.T. Freeman, and P. Viola. Learning Joint Statistical Models for Audio-Visual Fusion and Segregation. In Advances in Neural Information Processing Systems 13, MIT Press, Dec. 2000.

W.H. Sumby and Irwin Pollack. Visual Contribution to Speech Intelligibility in Noise. The Journal of the Acoustical Society of America. vol. 26, No. 2, pp. 212-215, Mar. 1954.
H. Attias, A. Acero, J.C. Platt, and L. Deng, Speech Denoising and Dereverberation using Probabalisitic Models, Microsoft Research, 2002, 7 pages.
M.J. Beal, H. Attias, and N. Jojic. Audio-video Sensor Fusion with Probabalistic Graphical Models, Microsoft Research, 2002. 15 pages.
V.R. De Sa and D. Ballard. Category Learning through Multi-Modality Sensing. In Neural Computation, 10(5), 1998. 24 pages.
Brendan Frey and Nebojsa Jojic. Estimating Mixture Models of Images and Inferring Spatial Transformations using the EM Algorithm, In Computer Vision and Pattern Recognition(CVPR), 1999, 7 pages.
J. Hershey and M. Casey, Audio-visual Sound Separation via Hidden Markov Models. In T.G. Dietterich, S. Becker, and Z. Ghahramani, editors, Advances in Neural Information Processing Systems 14, pp. 1173-1180, Cambridge, MA, 2002, MIT Press.
J. Hershey and J.R. Movellan, Audio Vision: Using Audio-visual Synchrony to Locate Sounds. In in Advances in Neural Information Processing Systems 12. S.A. Solla, T.K. Leen, and K.R. Muller(eds.), pp. 813-819, MIT Press, 2000.

* cited by examiner

*Primary Examiner*—Abul K. Azad
(74) *Attorney, Agent, or Firm*—Amin, Turocy & Calvin, LLP (57) ABSTRACT

A system and method facilitating speech detection and/or enhancement utilizing audio/video fusion is provided. The present invention fuses audio and video in a probabilistic generative model that implements cross-model, self-supervised learning, enabling rapid adaptation to audio visual data. The system can learn to detect and enhance speech in noise given only a short (e.g., 30 second) sequence of audio-visual data. In addition, it automatically learns to track the lips as they move around in the video.

20 Claims, 11 Drawing Sheets

SPEECH DETECTION AND ENHANCEMENT USING AUDIO/VIDEO FUSION

TECHNICAL FIELD

The present invention relates generally to signal enhancement, and more particularly to a system and method facilitating speech detection and/or enhancement through a probabilistic-based model that fuses audio and video models.

BACKGROUND OF THE INVENTION

The ease with which individuals can carry on a conversation in the midst of noise is often taken for granted. Sounds from different sources coalesce and obscure each other making it difficult to resolve what is heard into its constituent parts, and identify its source and content. This auditory scene analysis problem confounds current automatic speech recognition systems, which can fail to recognize speech in the presence of very small amounts of interfering noise. With regard to humans, vision often plays a crucial role, because individuals often have an unobstructed view of the lips that modulate the sound. In fact lip-reading can enhance speech recognition in humans as much as removing 15 dB of noise. This fact has motivated efforts to use video information for tasks of audio-visual scene analysis, such as speech recognition and speaker detection. Such systems have typically been built using separate modules for tasks such as tracking the lips, extracting features, and detecting speech components, where each module is independently designed to be invariant to different speaker characteristics, lighting conditions, and noise conditions.

One problem with modular systems designed for a variety of conditions is that there is typically a tradeoff between average performance across conditions and performance in any one condition. Thus, for example, a system that can adapt to a face under the current lighting condition may perform better than one designed for a variety of conditions without adaptation. Another pitfall of modular audio-visual systems is that the modules may be integrated in an ad hoc way that neglects information about the uncertainty within models, as well as neglecting statistical dependencies between the modalities. The two problems are related in that unsupervised adaptation is greatly facilitated by enforcing agreement between the audio and video modules during adaptation.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a system and method facilitating speech detection and/or enhancement utilizing audio/video fusion. As discussed previously, perceiving sounds in a noisy environment can be a challenging problem. Lip-reading can provide relevant information but is also challenging because lips are moving and a tracker must deal with a variety of conditions. Typically audio-visual systems have been assembled from individually engineered modules. The present invention fuses audio and video in a probabilistic generative model that implements cross-model, self-supervised learning, enabling rapid adaptation to audio visual data. The system can learn to detect and enhance speech in noise given only a short (e.g., 30 second) sequence of audio-visual data. In addition, it automatically learns to track the lips as they move around in the video.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

Figure 1:
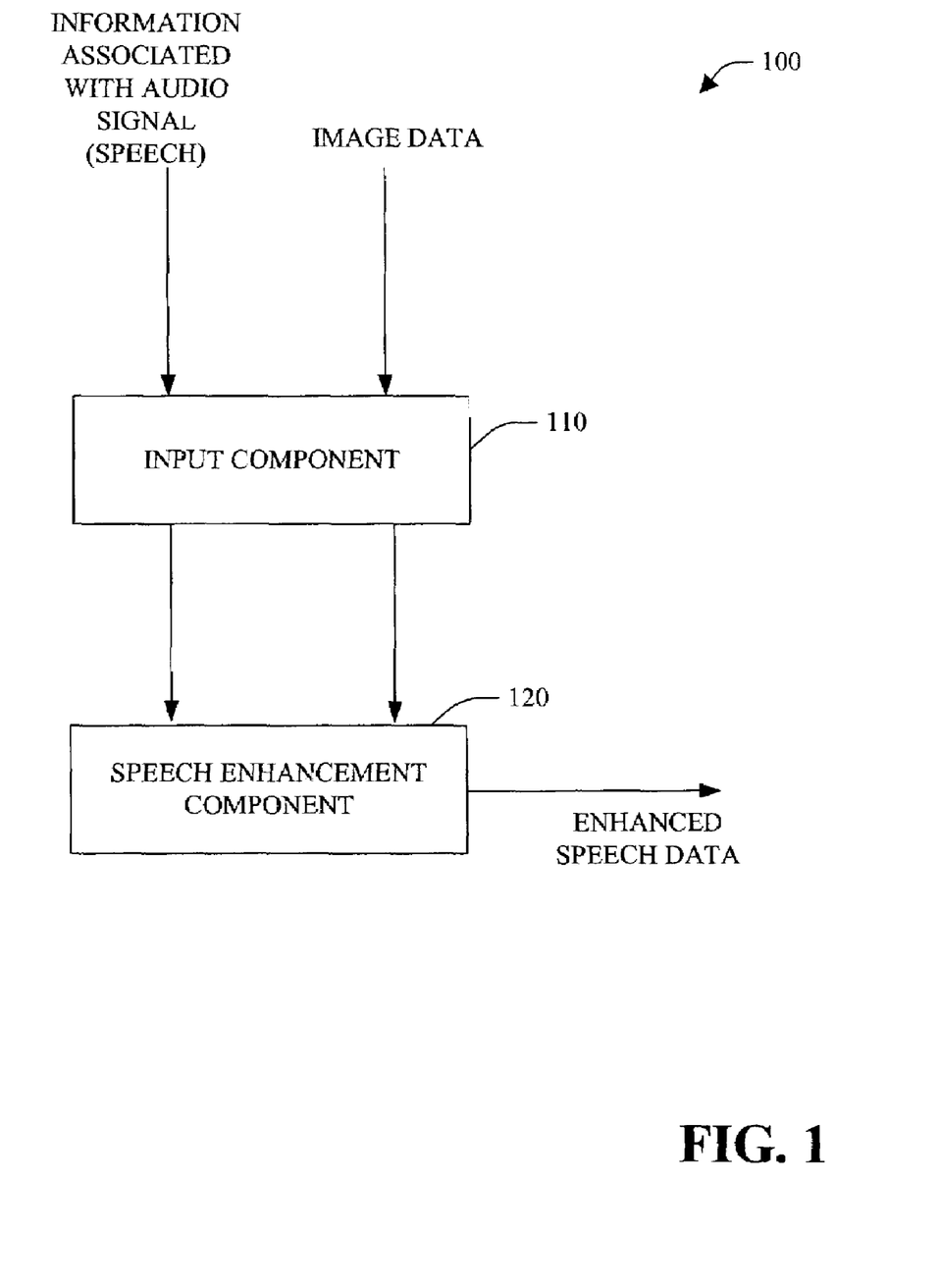
FIG. 1 is a block diagram of a system that facilitates enhancement of a speech signal in accordance with an aspect of the present invention.

Referring to FIG. 1, a system 100 that facilitates enhancement of a speech signal in accordance with an aspect of the present invention is illustrated. The system 100 fuses audio and video in a probabilistic generative model that implements cross-model, self-supervised learning, enabling rapid adaptation to audio visual data. The system 100 can learn to detect and enhance speech in noise given only a short (e.g., 30 second) sequence of audio-visual data. Further, in one example, the system 100 automatically learns to track the lips as they move around in the video.

Thus, the system 100 addresses the integration and the adaptation problems of audio-visual scene analysis by using a probabilistic generative model to combine video tracking, feature extraction, and tracking of the phonetic content of audio-visual speech. A generative model as employed in the system 100 offers several advantages. Dependencies between modalities can be captured and exploited. Further, principled methods of inference and learning across modalities that ensure the Bayes optimality of the system 100 can be utilized.

In one example, the model can be extended, for instance by adding temporal dynamics, in a principled way while maintaining optimality properties. Additionally, the same model can be used for a variety of inference tasks, such as enhancing speech by reading lips, detecting whether a person is speaking, or predicting the lips using audio.

In accordance with an aspect of the present invention, signal enhancement can be employed, for example, in the domains of improved human perceptual listening (especially for the hearing impaired), improved human visualization of corrupted images or videos, robust speech recognition, natural user interfaces, and communications. The difficulty of the signal enhancement task depends strongly on environmental conditions. Take an example of speech signal enhancement, when a speaker is close to a microphone and the noise level is low and when reverberation effects are fairly small, standard signal processing techniques often yield satisfactory performance. However, as the distance from the microphone increases, the distortion of the speech signal, resulting from large amounts of noise and significant reverberation, becomes gradually more severe.

The system 100 reduces limitations of conventional signal enhancement systems that have employed signal processing methods, such as spectral subtraction, noise cancellation, and array processing. These methods have had many well known successes; however, they have also fallen far short of offering a satisfactory, robust solution to the general signal enhancement problem. For example, one shortcoming of these conventional methods is that they typically exploit just second order statistics (e.g., functions of spectra) of the sensor signals and ignore higher order statistics. In other words, they implicitly make a Gaussian assumption on speech signals that are highly non-Gaussian. A related issue is that these methods typically disregard information on the statistical structure of speech signals. In addition, some of these methods suffer from the lack of a principled framework. This has resulted in ad hoc solutions, for example, spectral subtraction algorithms that recover the speech spectrum of a given frame by essentially subtracting the estimated noise spectrum from the sensor signal spectrum, requiring a special treatment when the result is negative due in part to incorrect estimation of the noise spectrum when it changes rapidly over time. Another example is the difficulty of combining algorithms that remove noise with algorithms that handle reverberation into a single system in a systematic manner.

In one example, the system 100 captures dependencies between cross-modal calibration parameters, unsupervised learning of video tracking and adaptation to noise conditions in a single model.

The system 100 employs a generative model that integrates audio and video by modeling the dependency between the noisy speech signal from a single microphone and the fine-scale appearance and location of the lips during speech. One use for this model is that of a human computer interaction: a person's audio and visual speech is captured by a camera and microphone mounted on the computer, along with other noise from the room: machine noise, another speaker, and so on.

Further, dependencies between elements in the model based on high-level intuitions about the relationships between modules are constructed. For instance knowing what the lips look like helps the system 100 infer the speech signal in the presence of noise. The converse is also true: what is being said can be utilized to help infer the appearance of the lips, along with the camera image, and a belief about where the lips are in the image. Thus, the system 100 employs information associated with appearance of the lips in order to find them in the image. The model employed by the system 100 parameterizes these relationships in a tractable way. By integrating substantially all of these elements in a systematic way, an adaptive system can learn to track audio-visual speech and perform useful tasks such as enhancement in a new situation without a complex set of prior information is produced.

The system 100 includes an input component 110 and a speech enhancement component 120. The input component 110 receives a speech signal and pixel-based image data relating to an originator of the speech signal. For example, the input component 110 can include a windowing component (not shown) and/or a frequency transformation component (not shown) that facilitates obtaining sub-band signals by applying an N-point window to the speech signal, for example, received from the audio input devices.

The windowing component can provide a windowed signal output. The frequency transformation component receives the windowed signal output from the windowing component and computes a frequency transform of the windowed signal. For purposes of discussion with regard to the present invention, a Fast Fourier Transform (FFT) of the windowed signal will be used; however, it is to be appreciated that the frequency transformation component can perform any type of frequency transform suitable for carrying out the present invention can be employed and all such types of frequency transforms are intended to fall within the scope of the hereto appended claims. The frequency transformation component provides frequency transformed, windowed signals to the speech enhancement component 120.

The speech enhancement component 120 employs a probabilistic-based model that correlates between the speech signal and the image data so as to facilitate discrimination of noise from the speech signal. The model fuses an audio model and video model. For purposes of explanation, an audio model will first be discussed.

Audio Model

Figure 2:
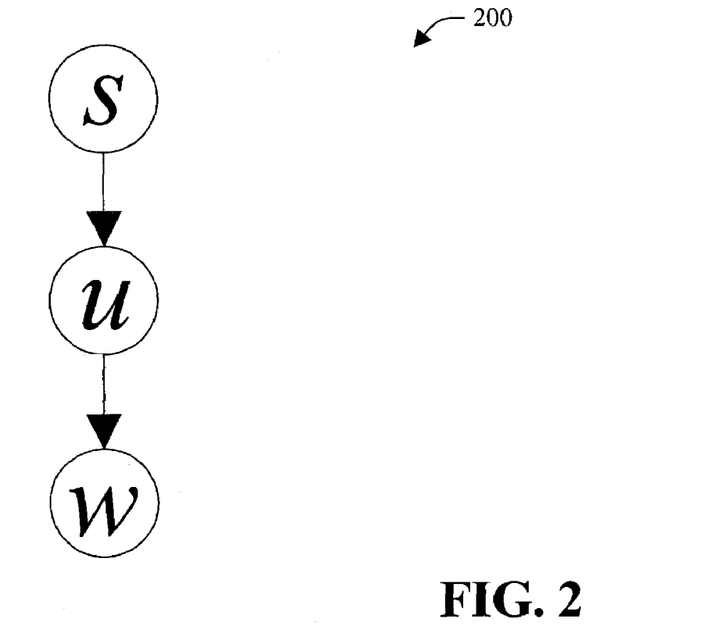
FIG. 2 is a graphical model representation of a generative model for audio in accordance with an aspect of the present invention.

Turning briefly to FIG. 2, a graphical model 200 representation for a generative model for audio in accordance with an aspect of the present invention is illustrated. A windowed short segment or frame of the observed microphone signal is represented in the frequency domain as a complex value, $w_k$, where k indexes the frequency band. This observed quantity is described in terms of the corresponding component of the clean speech signal $u_k$ corrupted by Gaussian noise. The speech signal is in turn modeled as a zero mean Gaussian mixture model with state variable s and state-dependent precision $\sigma_{sk}$, which corresponds to the inverse power of the frequency band k for state s. Thus the audio model is:

$$p(u|s) = \prod_k N(u_k | 0, \sigma_{sk}) \qquad (1)$$

$$p(s) = \pi_s$$

$$p(w|u) = \prod_k N(w_k | hu_k, \phi_k).$$

where the notation $N(x|\mu, \sigma)$ denotes a Gaussian distribution over random variable x with mean $\mu$ and inverse covariance $\sigma$.

Video Model

Figure 3:
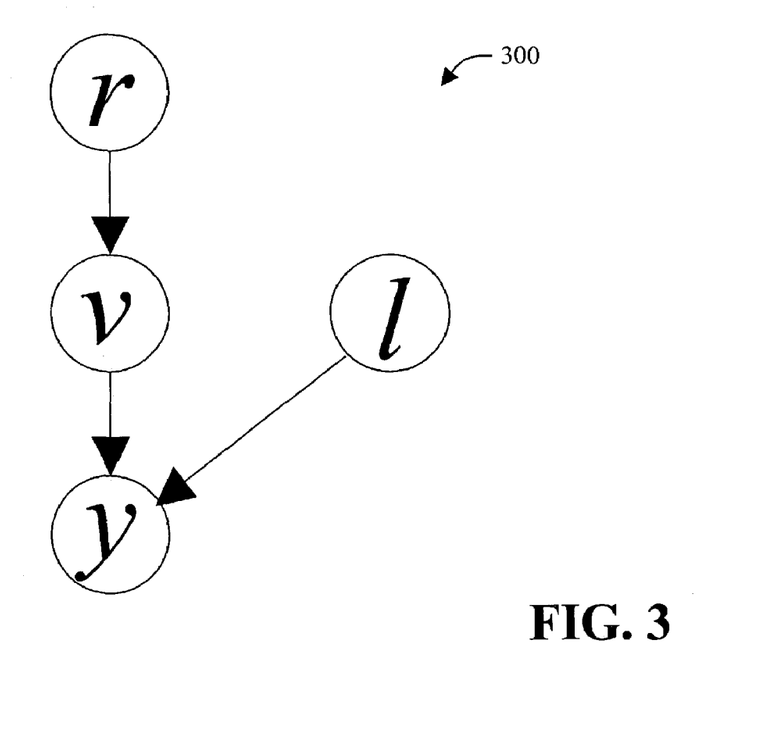
FIG. 3 is a graphical model representation of a generative model for video in accordance with an aspect of the present invention.

Next, referring to FIG. 3, a graphical model 300 representation of a generative model for video in accordance with an aspect of the present invention is illustrated. The video model 300 describes an observed frame of pixels from the camera, y as a noisy version of a hidden template v shifted in 2D by discrete location parameter l. v in turn is described as a weighted sum of linear basis functions, $A(j) \in R^{N \times 1}$ which make up the columns of A with weights given by hidden variables r. Such a model constitutes a factor analysis model that helps explain the covariance among the pixels in the template v within a linear subspace spanned by the columns of A. This uses far fewer parameters than the full covariance matrix of v while capturing the most important variances and provides low-dimensional set of causes, r.

Figure 4:
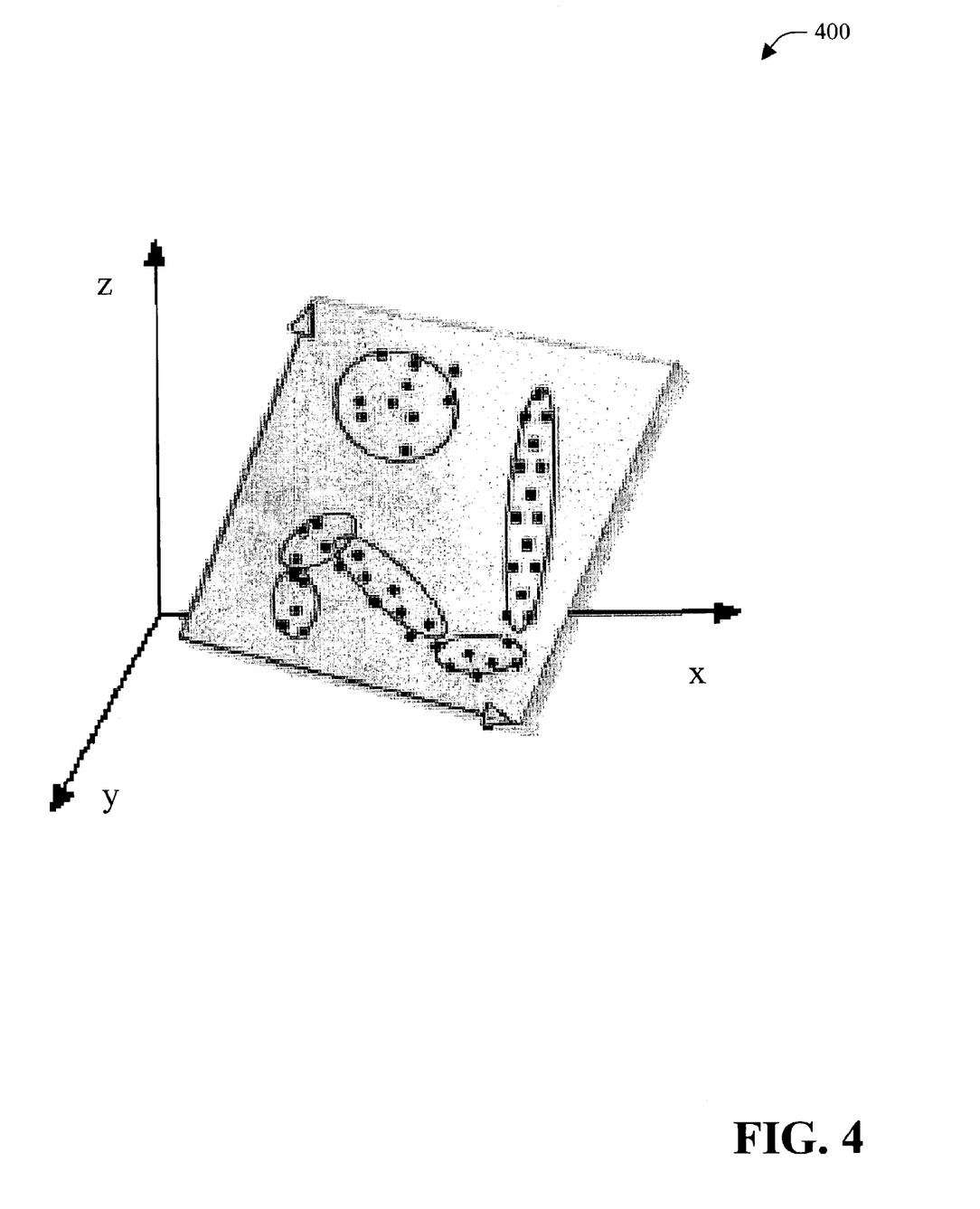
FIG. 4 is a three-dimensional graph of a video model as embedded subspace model in accordance with an aspect of the present invention.

Turning briefly to FIG. 4, a three-dimensional graph 400 of a video model as embedded subspace model in accordance with an aspect of the present invention is illustrated. r is projected into the subspace of v spanned by the columns of A. It is the further structure within this subspace that is described using audio in accordance with an aspect of the present invention.

Returning to FIG. 3, the video model is parameterized as $$p(l) = const. \qquad (2)$$

$$p(v|r) = \prod_i N\left(v_i \middle| \sum_j A_{ij} r_j + \mu_i, v_i\right)$$

$$p(y|v, l) = \prod_i N(y_i | v_{i-l}, \lambda).$$

where $v_{i-l}$ is shorthand for $v_\xi(x_i - x_l)$ where x(i) is the position of the $i^{th}$ pixel, $x_l$ is the position represented by l, and $\xi(x)$ is the index of v corresponding to 2D position x.

Audio Visual Model

Figure 5:
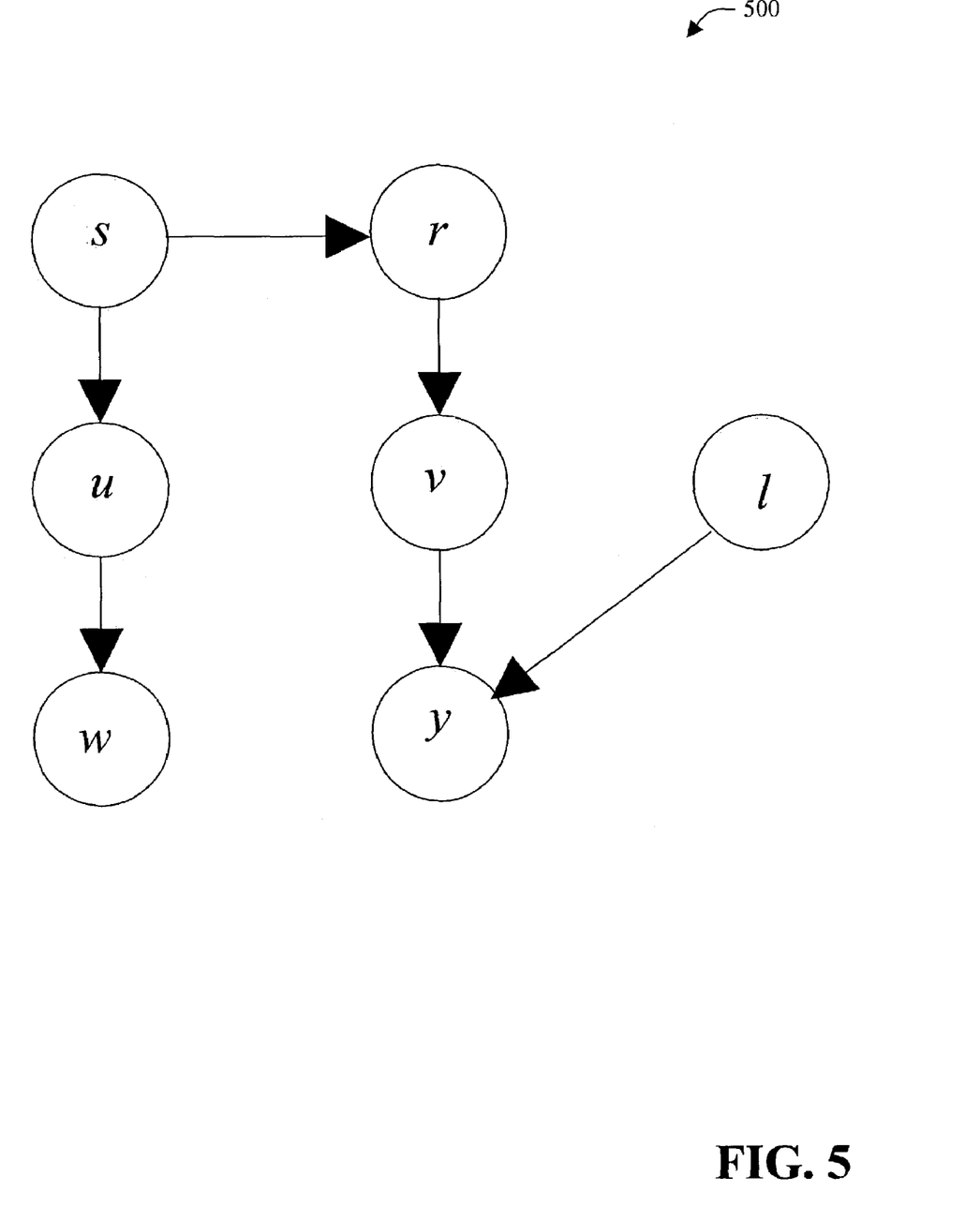
FIG. 5 is graphical model representation of a generative model for audio video in accordance with an aspect of the present invention.

Referring to FIG. 5, a graphical model 500 representation of a generative model for audio video in accordance with an aspect of the present invention is illustrated. The audio video model is employed by the speech enhancement component 120. Each of the audio model and the video model discussed previously is fairly simple, but by exploiting cross-modal fusion, the system 100 can become a system that is more than just the sum of its parts. The two models are fused together by allowing the mean and precisions of the hidden video factors r to depend on the states s:

$$p(r|s) = \prod_j N(r_j | \eta_{sj}, \psi_{sj}). \qquad (3)$$

The discrete variable s thus controls the location and directions of covariance of a video representation that is embedded in a linear subspace of the pixels.

It is to be appreciated that the object $v_i$ is generally larger than the observed pixel array $y_i$ (e.g., it can be infinitely large). It would be mathematically convenient to let the observed pixel index run to 2-dim infinity as well. For this purpose, binary variables $\alpha_i$, such that $\alpha_i = 1$ if i falls within the array, i.e., $y_i$ is observed, are introduced. The term log p (y|v,l) in the derivation is replaced by $\Sigma_i \alpha_i \log N(y_i | v_{i-l}, \lambda)$. The range of i is not bounded but $y_i$ outside the pixel array will not affect the likelihood.

In accordance with an aspect of the present invention, the probabilistic-based model employed by the speech enhancement component 120 is adapted employing a variational technique, for example, an expectation-maximization (EM) algorithm. An EM algorithm includes a maximization step (or M-step) and an expectation step (or E-step). The M-step updates parameters of the model, and the E-step updates sufficient statistics. In other words, the EM algorithm is employed to estimate the model parameters spectra from the observed data via the M-step. The EM algorithm also computes the required sufficient statistics (SS) and the enhanced speech signal via the E-step. An iteration in the EM algorithm consists of an E-step and an M-step. For each iteration, the algorithm gradually improves the parameterization until convergence. The EM algorithm may be performed as many EM iterations as necessary (e.g., to substantial convergence). The EM algorithm uses a systematic approximation to compute the SS.

Inference (E-Step)

In the E-step, the posterior distribution over the hidden variables is computed. The sufficient statistic, required for the M-step, are obtained from the moments of the posterior.

A variational EM algorithm that decouples l from v can be derived to simplify the computation. It can be shown that the posterior p (u, s, r, v|y, w) has the factorized form:

$$p(u,s,r,v|y,w) = q(u|s)q(s)q(r|s)q(v|r,l)q(l) \qquad (4)$$

A variational approximation that decouples v from l (e.g., q(v|r,l)=q(v|r)). Then:

$$p(u,s,r,v|y,w) \approx q(u|s)q(s)q(r|s)q(v|r,l)q(l) \qquad (5)$$

For u, the following is determined:

$$q(u|s) = \prod_k N(u_k | \bar{\rho}_{sk}, \bar{\sigma}_{sk}) \qquad (6)$$

-continued $$\overline{p}_{sk} = \frac{1}{\overline{\sigma}_{sk}} h \phi_k w_k$$

$$\overline{\sigma}_{sk} = h^2 \phi_k + \sigma_{sk}.$$

For v, the following is determined:

$$q(v \mid r) = \prod_i N\left(v_i \left| \sum_j \overline{A}_{ij} r_j + \overline{\mu}_i, \overline{v}i \right. \right) \quad (7)$$

$$\overline{v}_i = \lambda E_l \alpha_{i+l} + v_i$$

$$\overline{\mu}_i = \frac{1}{\overline{v}_i}(v_i \mu_i + \lambda E_l \alpha_{i+l} y_{i+l})$$

$$\overline{A}_{ij} = \frac{v_i}{\overline{v}_i} A_{ij}.$$

For r, the following is determined:

$$q(r\mid s) = N(r\mid \overline{\eta}_s, \overline{\psi}_s)$$

$$\overline{\eta}_s = \overline{\psi}_s^{-1}[\psi_s \eta_s + A^T D(E_i v - \mu)]$$

$$\overline{\psi}_s = A^T D A + \psi_s \quad (8)$$

where D is a diagonal matrix defined by $$D_{ii} = v_i \left(\frac{\lambda \alpha_i}{\overline{v}_i}\right)^2. \quad (9)$$

For s, the following is determined:

$$(q) = \overline{\pi}_s \quad (10)$$

$$\log \overline{\pi}_s = $$

$$\log \pi_s - \sum_k \left(\phi k \left| w_k - h \overline{p}_k \right|^2 + \log \frac{\sigma_{sk}}{\overline{\sigma}_{sk}} - \sigma_{sk} |\overline{p}_{sk}|^2\right) + \log \left|\psi_s \overline{\psi}_s^{-1}\right| -$$

$$\frac{1}{2}\sum_j \psi_{sj}(\overline{\eta}_{sj} - \eta_{sj})^2 - \frac{1}{2}\sum_i v_i \left[\sum_j (\overline{A}_{ij} - A_{ij})\overline{\eta}_{sj} + \overline{\mu}_i - \mu_i \right]^2 -$$

$$\frac{\lambda}{2}\sum_i \left[E_l \alpha_{i+l}\left(y_{i+l} - \sum_j \overline{A}_{ij}\overline{\eta}_{sj} - \overline{\mu}_i\right)^2 + (\overline{A}\overline{\psi}_s^{-1}\overline{A}^T)_{ii}\right]$$

for l, the following is determined:

$$q(l) \propto e^{f(l)} p(l) \quad (11)$$

$$f(l) = -\frac{\lambda}{2}\sum_i \alpha_{i+l}\left(y_{i+l} - \sum_{sj} \overline{A}_{ij} \overline{\pi}_s \overline{\eta}_{sj} - \overline{\mu}_i \right)^2.$$

Learning (M-Step)

In the M-step, the model parameters are computed. The update rules use sufficient statistics which involve two types of averages. E denotes the average with respect to the posterior q at a given frame n, and, <·> denotes an overage over frames n.

For h, φ, the following is obtained:

$$h = \frac{\text{Re}\sum_k \phi_k \langle wk E u_k^* \rangle}{\sum_k \phi_k \langle E \mid u_k \mid^2 \rangle} \quad (12)$$

$$\frac{1}{\phi_k} = \langle \mid w_k \mid^2 \rangle - 2h\text{Re}\langle w_k E u_k^* \rangle + \langle E \mid u_k \mid^2 \rangle$$

where $$E u_k = \sum_s \overline{\pi}_s \overline{p}_{sk} \quad (13)$$

$$E \mid u_k \mid^2 = \sum_s \overline{\pi}_s \left(|\overline{p}_{sk}|^2 + \frac{1}{\overline{\sigma}_{sk}}\right)$$

For A, μ, v, the following is obtained:

$$A = (Evr^T - EvEr^T)(Err^T - ErEr^T)^{-1}$$

$$\mu = (Ev - AEr)$$

$$v^{-1} = \text{Diag}(Evv^T - AErv^T - \mu Ev^T) \quad (14)$$

where "Diag" refers to the diagonal of the matrix. For the averages:

$$Er = \sum_s \overline{\pi}_s \overline{\eta}_s \quad (15)$$

$$Err^T = \sum_s \overline{\pi}_s \left(\overline{\eta}_s \overline{\eta}_s^T + \overline{\psi}_s^{-1}\right)$$

$$Ev = \sum_s \overline{\pi}_s (\overline{A}\overline{\eta}_s + \overline{\mu})$$

$$Evr^T = \sum_s \overline{\pi}_s \left[(\overline{A}\overline{\eta}_s + \overline{\mu})\overline{\eta}_s^T + \overline{A}\overline{\psi}_s^{-1}\right]$$

$$Evv^T = \sum_s \overline{\pi}_s \left[(\overline{A}\overline{\eta}_s + \overline{\mu})(\overline{A}\overline{\eta}_s + \overline{\mu})^T + \overline{A}\overline{\psi}_s^{-1}\overline{A}^T + v^{-1}\right]$$

Finally, for η, ψ, the following is obtained:

$$\eta_{sj} = \langle \overline{\eta}_{sj} \rangle \quad (16)$$

$$\frac{1}{\psi_{sj}} = \langle (\overline{\eta}_{sj} - \eta_{sj})^2 + (\overline{\psi}_s^{-1})_{jj} \rangle$$

Results of Experiments

Figure 6:
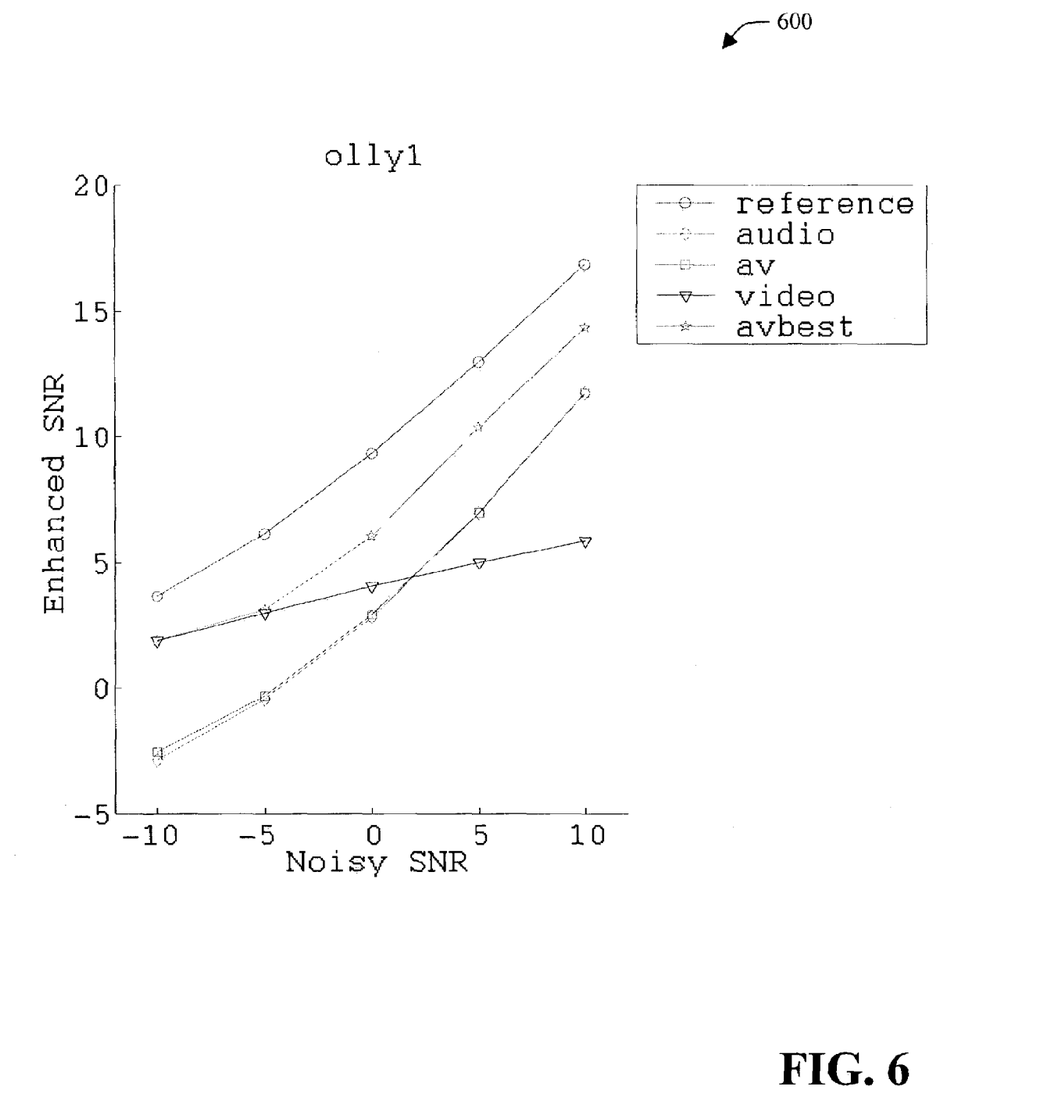
FIG. 6 is a graph of results in accordance with an aspect of the present invention.
Figure 7:
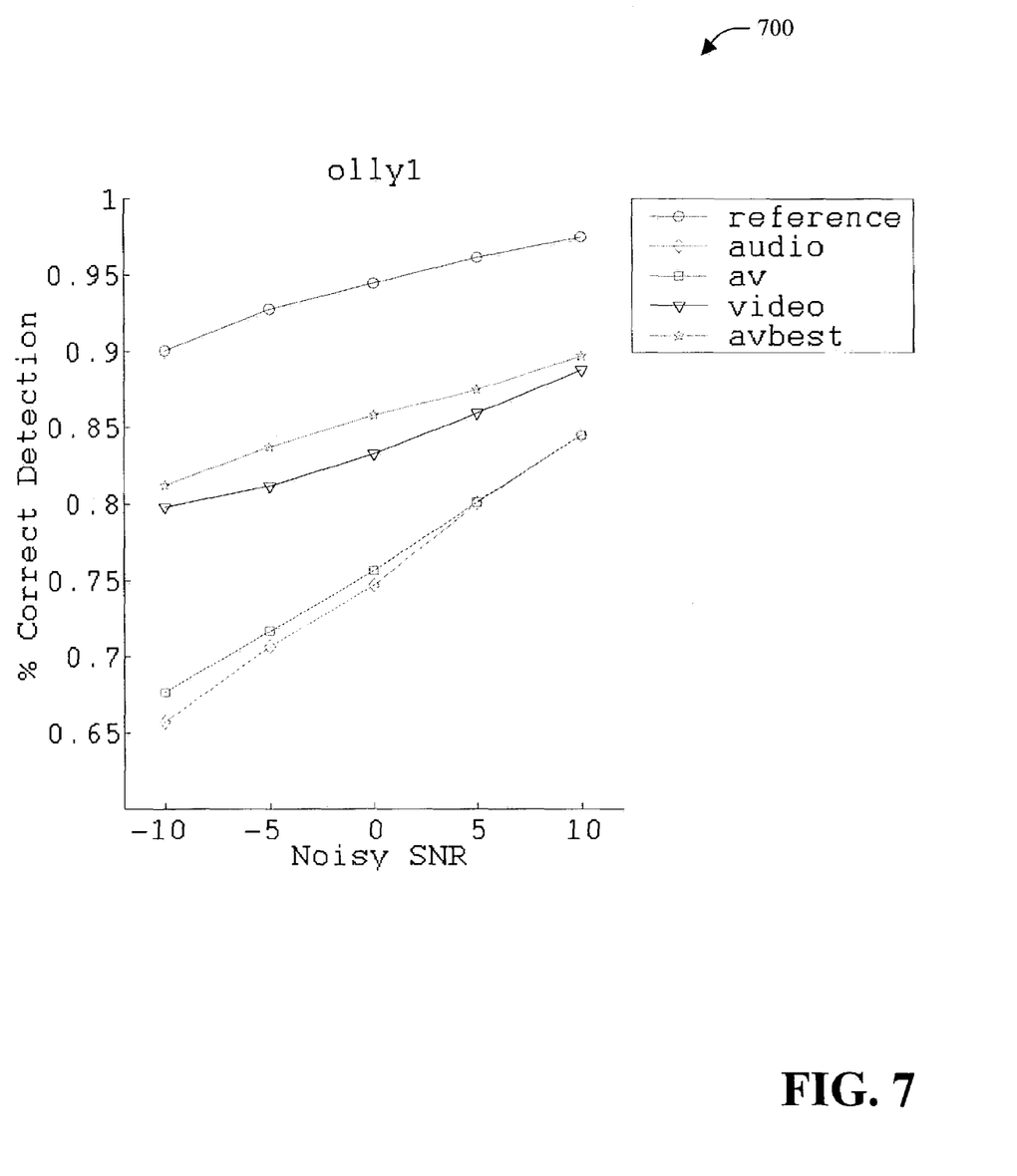
FIG. 7 is a graph of results in accordance with an aspect of the present invention.

Experiments to demonstrate the viability of the technique for the tasks of speech enhancement and speech detection were conducted. The data includes video from Carnegie Mellon University Audio Visual Speech Processing Database. The model was adapted to a 30-second audio-visual sequence of the face cropped around the lip area, as well as to 10 seconds of audio noise of an interfering speaker, and then tested the model with new sequences mixed with audio noise. Results are shown in FIG. 6. FIG. 7 shows a speech detection result obtained by thresholding the enhanced signal.

Figure 8:
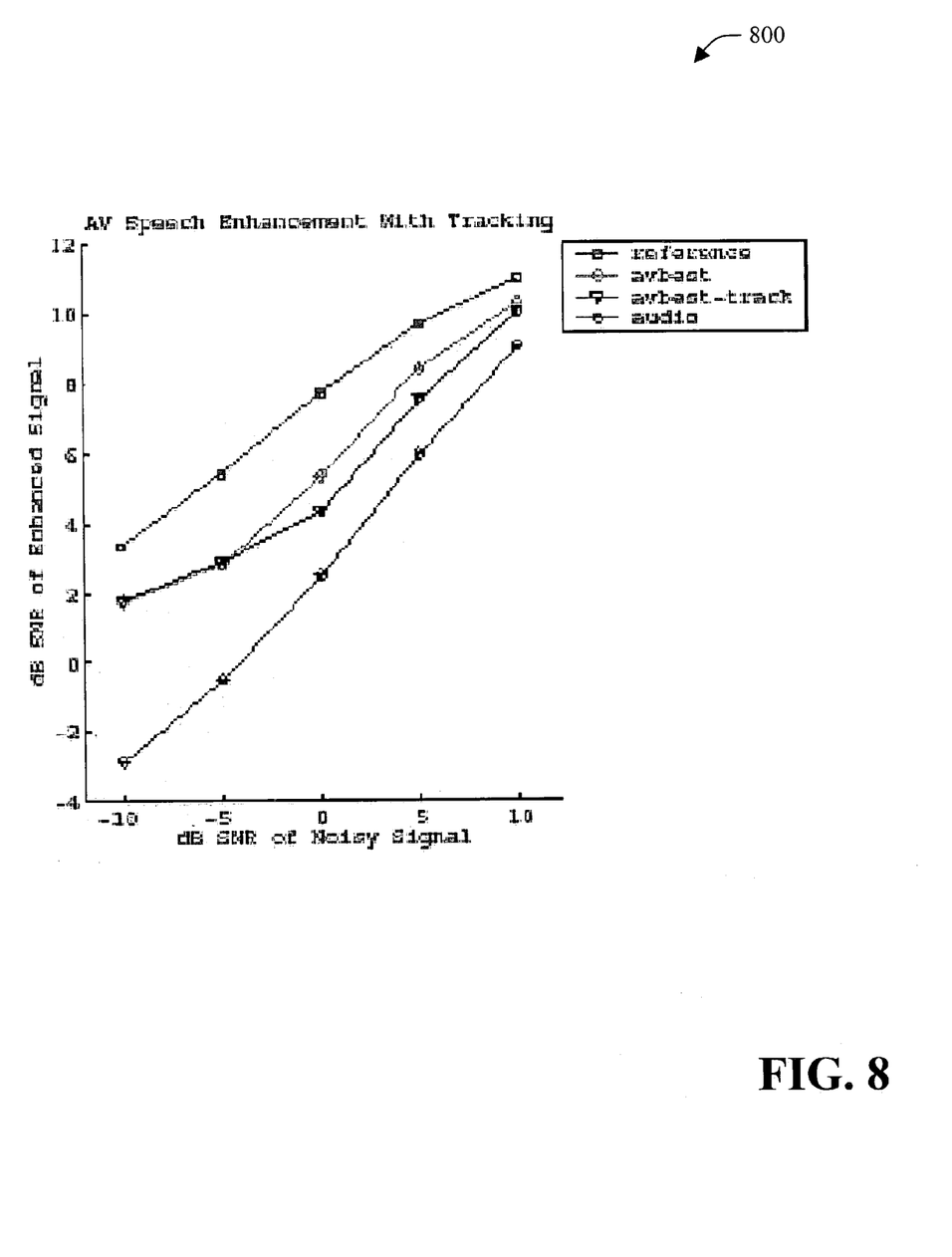
FIG. 8 is a graph of results in accordance with an aspect of the present invention.

In another experiment with different data, enhancement performance was compared on unaligned video in which the lips move around significantly to that for aligned images. FIG. 8 shows that tracking is able to almost completely compensate for lip motion.

In accordance with an aspect of the present invention, the system is adaptive is adaptive to lip video from various angle(s) (e.g., profile). In one example, the system 100 is adaptive to a fully unsupervised condition in which the system 100 is given full-frame data of a person talking with visual and audio distracters. The system 100 is adaptive to find the face and lips of the person talking, learn to track the face and lips, learn the components of speech in noise, and enhance the noisy speech.

Figure 9:
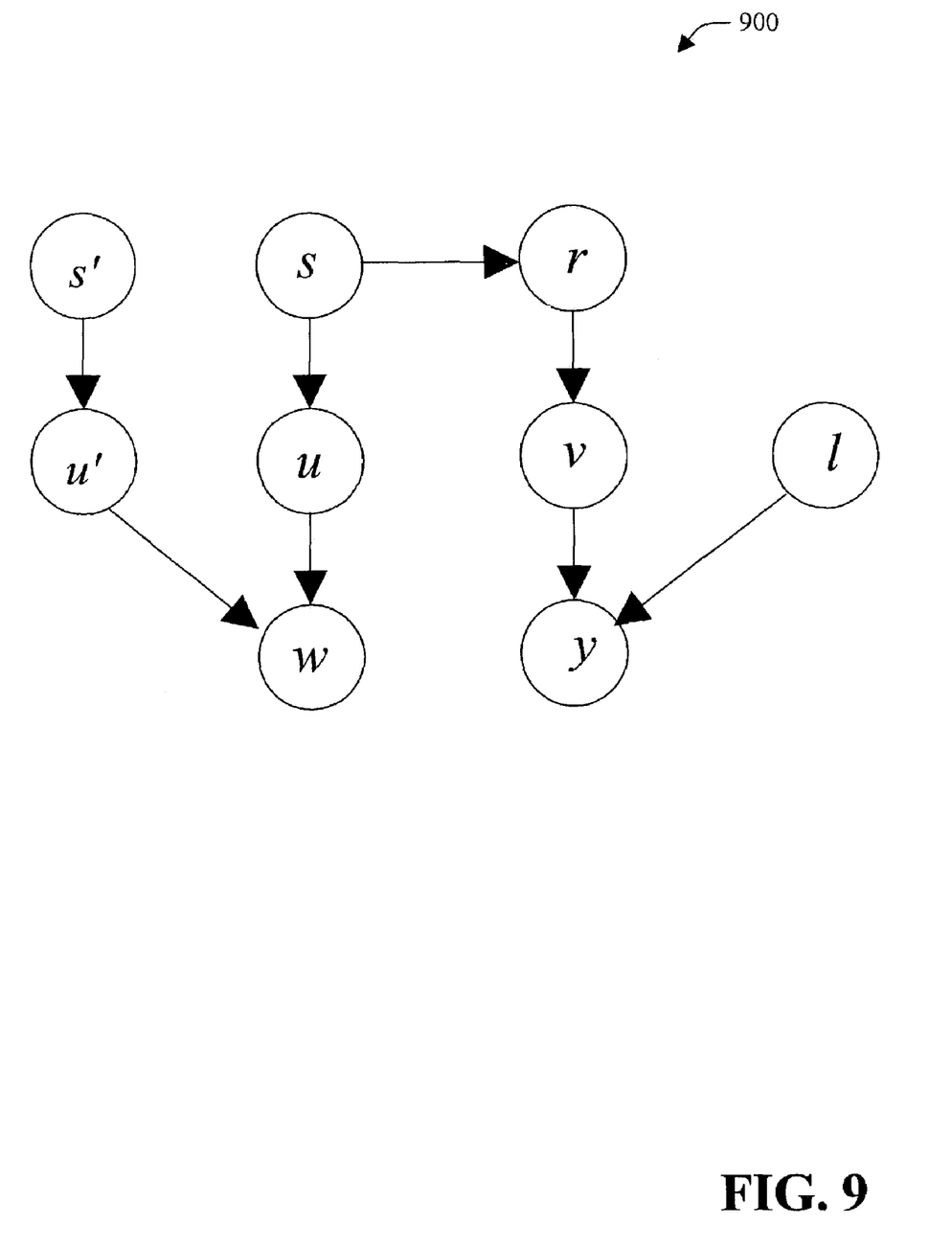
FIG. 9 is a graphical model of a mixture noise model in accordance with an aspect of the present invention.
Figure 10:
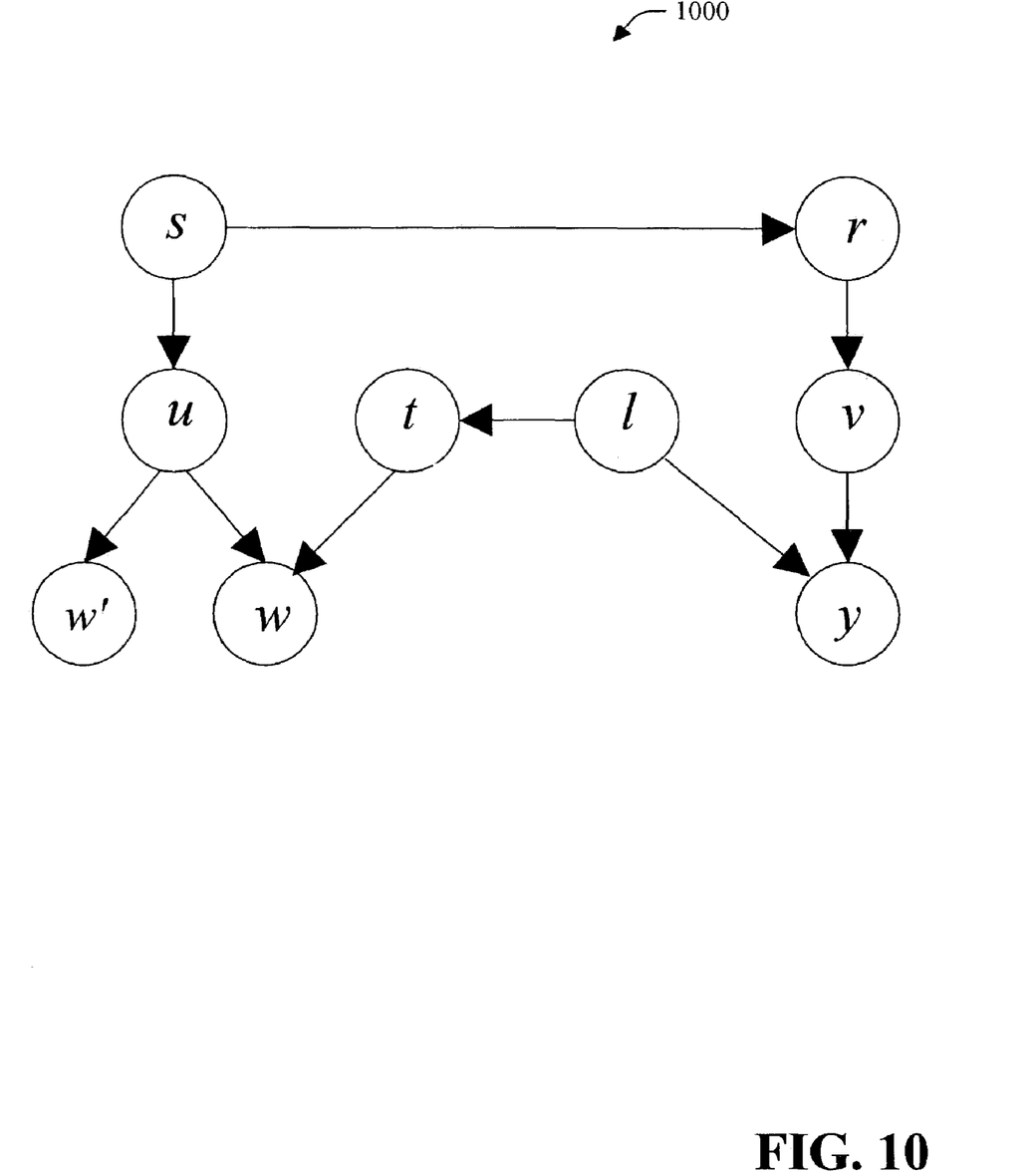
FIG. 10 is a graphical model of a two microphone extension of an audio video model in accordance with an aspect of the present invention.

Those skilled in the art will recognize that the systematic nature of the graphical model framework of the present invention allows for integration of the generative audio-visual model with other sub-modules. In particular, the simplistic noise model discussed can be replaced with a mixture model, as depicted in FIG. 9. Further, the addition of another microphone can further improve both noise robustness and tracking. The model with this extension is depicted in FIG. 10. Yet other variations of the system 100 include the use of two cameras for stereo vision, scaling and rotation invariance, affine transformations, and a video background model. Thus, it is to be appreciated that the system 100 of the present invention can include zero, one or more of these extension(s) and all such types of extensions are intended to fall within the scope of the hereto appended claims.

While FIG. 1 is a block diagram illustrating components for the system 100, it is to be appreciated that the system 100, the input component 110 and/or the speech enhancement component 120 can be implemented as one or more computer components, as that term is defined herein. Thus, it is to be appreciated that computer executable components operable to implement the system 100, the input component 110 and/or the speech enhancement component 120 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 11:
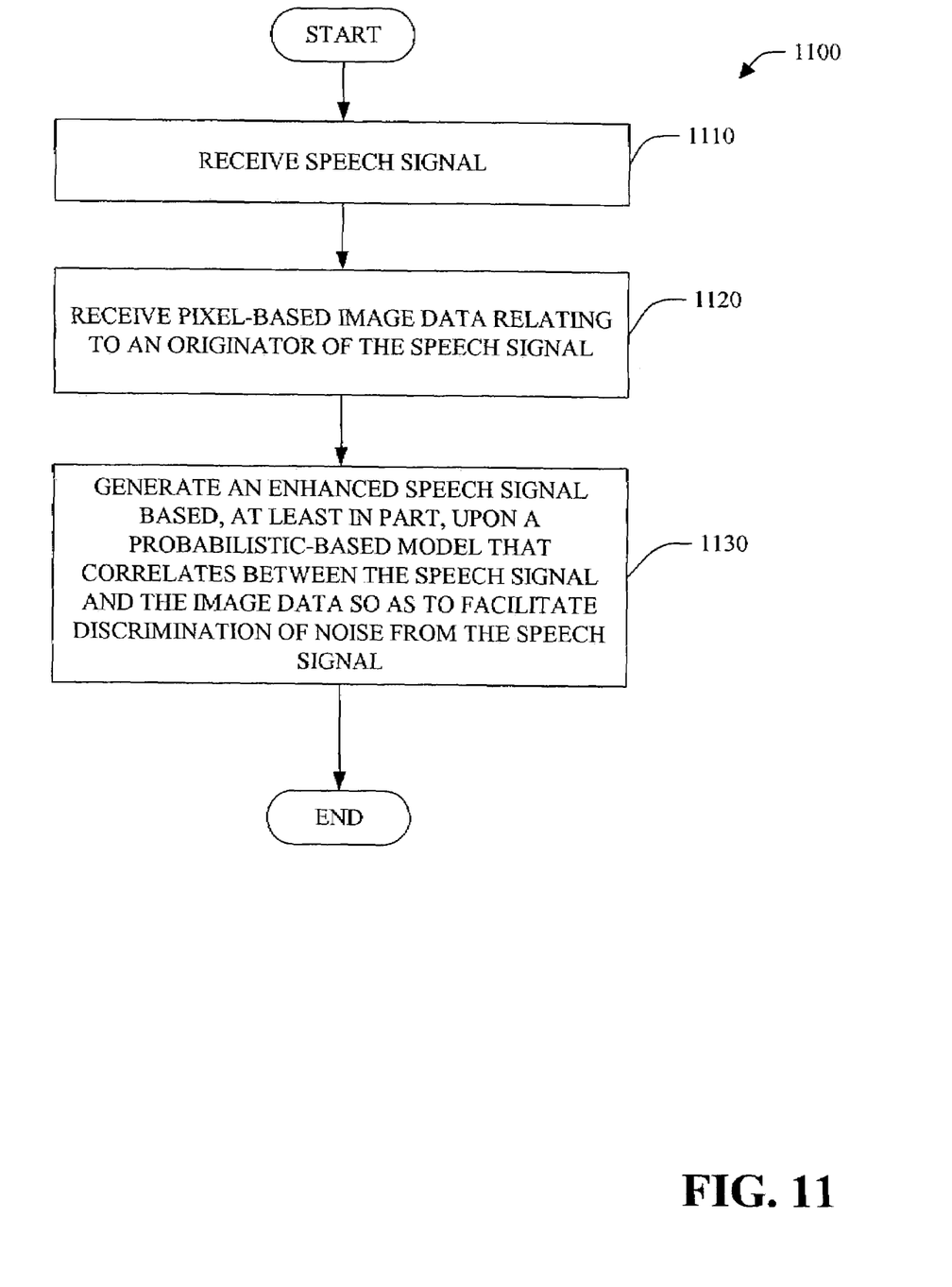
FIG. 11 is a flow chart of a method facilitating enhancement of a speech signal in accordance with an aspect of the present invention.

Turning briefly to FIG. 11, a methodology that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 11, a method 1100 facilitating enhancement of a speech signal in accordance with an aspect of the present invention is illustrated. At 1110, a speech signal is received. At 1120, pixel-based image data relating to an originator of the speech signal is received. At 1130, an enhanced speech signal is generated based, at least in part, upon a probabilistic-based model that correlates between the speech signal and the image data so as to facilitate discrimination of noise from the speech signal.

Figure 12:
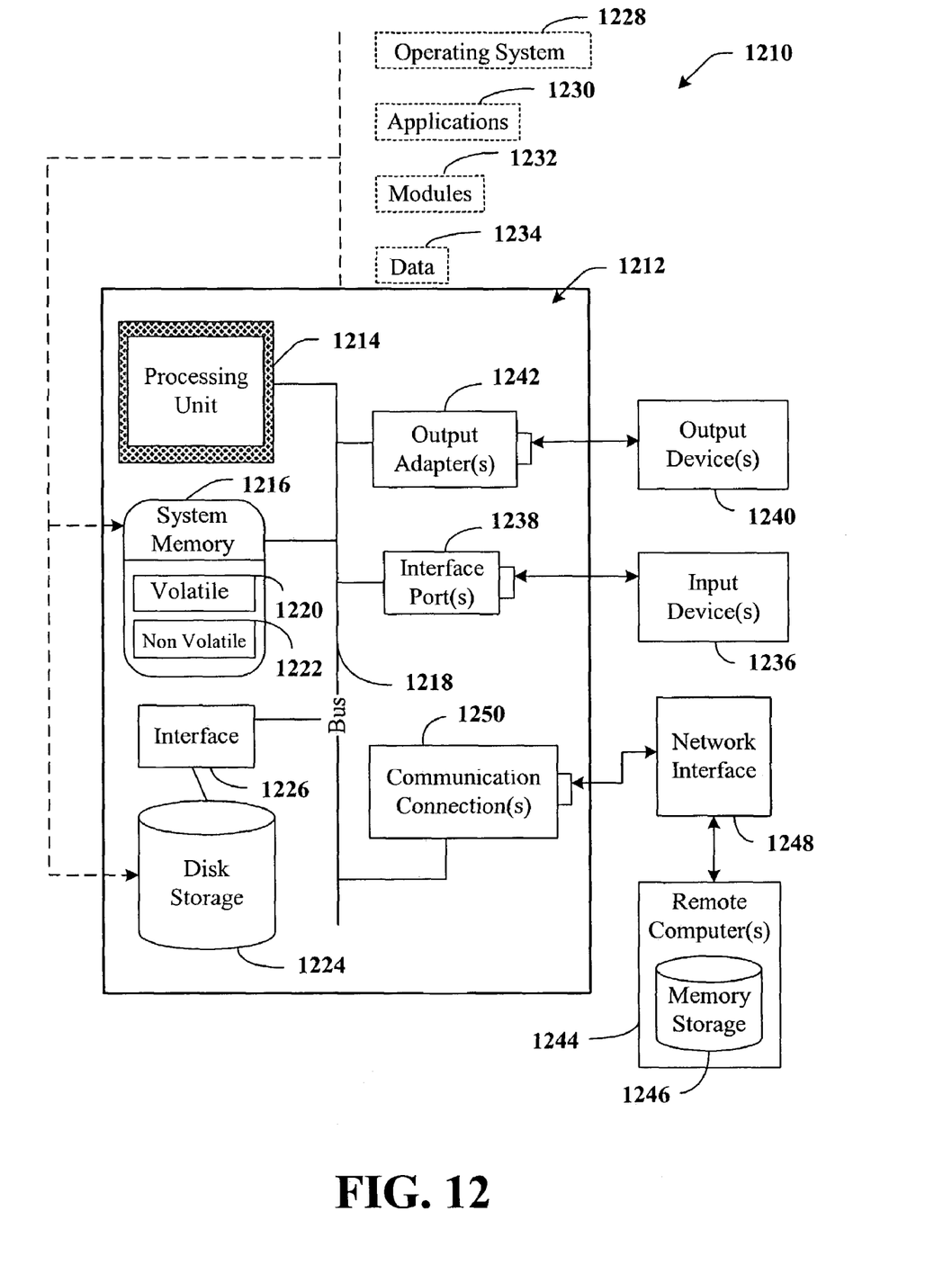
FIG. 12 illustrates an example operating environment in which the present invention may function.

In order to provide additional context for various aspects of the present invention, FIG. 12 and the following discussion are intended to provide a brief, general description of a suitable operating environment 1210 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 1210 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 12, an exemplary environment 1210 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/nonremovable, volatile/nonvolatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the present invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers among other output devices 1240 that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates enhancement of a speech signal, comprising:
    an input component that receives a speech signal and pixel-based image data relating to an originator of the speech signal; and
    a speech enhancement component that is configured to infer correlations between the speech signal and the pixel-based image data by employing a probabilistic-based model comprising a video embedded subspace model fused with an audio mixture model such that a hidden variable that represents the pixel-based image data in lower dimensions depends on a state variable of the speech signal.

2. The system of claim 1, wherein the audio model is based at least in part upon:

$$p(u \mid s) = \prod_k N(u_k \mid 0, \sigma_{sk})$$

$$p(s) = \pi_s$$

$$p(w \mid u) = \prod_k N(w_k \mid hu_k, \phi_k)$$

where $u_k$ is a clean speech signal,
    $W_k$ is the speech signal,
    s is the state variable of the speech signal, and
    the notation N (x|μ, σ) denotes a Gaussian distribution over random variable
    x with mean μ and inverse covariance σ.

3. The system of claim 1, wherein the video model is based at least in part upon:

$$p(l) = const.$$

$$p(v \mid r) = \prod_i N\left(v_i \mid \sum_j A_{ij} r_j + \mu_i, v_i\right)$$

$$p(y \mid v, l) = \prod_i N(y_i \mid v_{i-l}, \lambda)$$

where y is the pixel-based image data, is the hidden variable that represents the pixel-based image data in lower dimensions,
A is a matrix of weights for the hidden variable r,
l is a location parameter,
v is a hidden clean pixel-based image,
$v_{i-l}$ is shorthand for $v_\xi(x_i-x_l)$,
x(i) is the position of the $i^{th}$ pixel,
$x_l$ is the position represented by l, and
ξ(x) is the index of v corresponding to 2D position x.

4. The system of claim 1, wherein the probabilistic-based model is based at least in part upon:

$$p(r|s) = \prod_j N(r_j | \eta_{sj}, \psi_{sj})$$

where r is the hidden variable that represents the pixel-based image data in lower dimensions
s is the state variable of the speech signal,
ψ is a precision matrix parameter associated with s, and
η is a precision matrix parameter associated with s.

5. The system of claim 1, wherein the speech enhancement component is configured to infer the correlations between the speech signal and the pixel-based image data based upon a variational expectation maximization algorithm having an E-step and an M-step.

6. The system of claim 5, wherein the variational expectation maximization algorithm is based at least in part on:

p(u,s,r,v|y,w)≈q(u|s)q(s)q(r|s)q(v|r,l)q(l)

where u is a clean speech signal,
s is the state variable of the speech signal,
r is the hidden variable that represents the pixel-based image data in lower dimensions
v is a hidden clean pixel-based image,
y is the pixel-based image,
w is the speech signal, and
l is a location parameter.

7. The system of claim 5, wherein the expectation maximization algorithm is based at least in part on:

$$h = \frac{\text{Re} \sum_k \phi_k \langle wkEu_k^* \rangle}{\sum_k \phi_k \langle E|u_k|^2 \rangle}$$

$$\frac{1}{\phi_k} = \langle |w_k|^2 \rangle - 2h\,\text{Re}\langle w_k Eu_k^* \rangle + \langle E|u_k|^2 \rangle$$

where $$Eu_k = \sum_s \bar{\pi}_s \bar{\rho}_{sk}$$

$$E|u_k|^2 = \sum_s \bar{\pi}_s \left( |\bar{\rho}_{sk}|^2 + \frac{1}{\sigma_{sk}} \right)$$

and
$u_k$ is a clean speech signal,
$w_k$ is the speech signal,
$\pi_s$ is a prior probability parameter of s, and
$\sigma_{sk}$ is an inverse covariance.

8. The system of claim 7, wherein the expectation maximization algorithm is further based at least in part on:

$A=(Evr^T-EvEr^T)(Err^T-ErEr^T)^{-1}$

μ=(Ev-AEr)

$v^{-1}$=Diag($Evv^T-AErv^T-\mu Ev^T$)

where "Diag" refers to a diagonal of the matrix, and $$Er = \sum_s \bar{\pi}_s \bar{\eta}_s$$

$$Err^T = \sum_s \bar{\pi}_s \left( \bar{\eta}_s \bar{\eta}_s^T + \bar{\psi}_s^{-1} \right)$$

$$Ev = \sum_s \bar{\pi}_s (\overline{A\eta}_s + \bar{\mu})$$

$$Evr^T = \sum_s \bar{\pi}_s \left[ (\overline{A\eta}_s + \bar{\mu}) \bar{\eta}_s^T + \overline{A}\,\bar{\psi}_s^{-1} \right]$$

$$Evv^T = \sum_s \bar{\pi}_s \left[ (\overline{A\eta}_s + \bar{\mu})(\overline{A\eta}_s + \bar{\mu})^T + \overline{A}\,\bar{\psi}_s^{-1}\overline{A}^T + \bar{v}^{-1} \right]$$

9. The system of claim 8, wherein the expectation maximization algorithm is further based at least in part on the equation:

$$\eta_{sj} = \langle \bar{\eta}_{sj} \rangle$$

$$\frac{1}{\psi_{sj}} = \langle (\bar{\eta}_{sj} - \eta_{sj})^2 + (\psi_s^{-1})_{jj} \rangle$$

10. The system of claim 1, wherein the pixel-based image data comprises information associated with an appearance of lips of the originator of the speech signal.

11. The system of claim 1, wherein the speech enhancement component that is configured to infer correlations between the speech signal and the pixel-based image data comprises a speech component that is configured to track lips of the originator of the speech signal in order to facilitate discrimination of noise from the speech signal.

12. The system of claim 1, wherein the input component further comprises a frequency transformation component that is configured to receive windowed signal inputs, compute a frequency transform of the windowed signal inputs, and provide outputs of the frequency transformed windowed signal inputs to the speech enhancement component.

13. The system of claim 12, further comprising a windowing component that is configured to apply an N-point window to the speech signal and provide windowed signal inputs to the frequency transformation component.

14. The system of claim 1, further comprising at least two audio input devices that is configured to provide speech signals.

15. The system of claim 1, wherein the probabilistic-based model is configured to be trained at least in part during operation of the system.

16. A method of facilitating enhancement of a speech signal, comprising:
receiving a speech signal;
receiving pixel-based image data relating to an originator of the speech signal;
inferring correlations between the speech signal and the pixel-based image data using a probabilistic-based model comprising a video embedded subspace model fused with an audio mixture model such that a hidden variable that represents the pixel-based image data in lower dimensions depends on a state variable of the speech signal; and
generating an enhanced speech signal based at least in part upon the correlations between the speech signal and the pixel-based image data.

17. The method of claim 16 further comprising providing an output associated with the enhanced speech signal.

18. A data packet configured to be transmitted between two or more computer components that are configured to facilitate enhancement of a speech signal, the data packet comprising:

an enhanced speech signal generated at least in part utilizing a probabilistic-based model that is configured to infer correlations between a speech signal and image data related to an originator of the speech signal, the probabilistic-based model comprising a video embedded subspace model fused with an audio mixture model such that a hidden variable that represents the image data in lower dimensions depends on a state variable of the speech signal.

19. A computer readable medium storing computer executable components of a system that facilitates enhancement of a speech signal, the computer executable components comprising:

an input component configured to receive a speech signal and image data relating to an originator of the speech signal; and an speech enhancement component configured to employ a probabilistic-based model that is configured to correlate the speech signal and the image data, the probabilistic-based model comprising a video embedded subspace model fused with an audio mixture model such that a hidden variable that represents the image data in lower dimensions depends on a state variable of the speech signal.

20. A system that facilitates enhancement of a speech signal comprising:

means for receiving a speech signal and image data relating to an originator of the speech signal; and means for enhancing the speech signal, the means for enhancing configured to employ a probabilistic-based model that is configured to correlate the speech signal and the image data, the probabilistic-based model comprising a video embedded subspace model fused with an audio mixture model such that a hidden variable that represents the image data in lower dimensions depends on a state variable of the speech signal.

* * * * *